May 15, 1962

C. STEFANCIN 3,034,484

ROTARY ENGINE

Filed Feb. 2, 1961

INVENTOR.
CARL STEFANCIN
BY Hudson, Boughton,
Williams, David & Hoffmann
ATTORNEYS May 15, 1962 C. STEFANCIN 3,034,484
ROTARY ENGINE
Filed Feb. 2, 1961 5 Sheets-Sheet 2

INVENTOR.
CARL STEFANCIN
BY Hudson, Boughton,
Williams, David & Hoffman
ATTORNEYS May 15, 1962 C. STEFANCIN 3,034,484
ROTARY ENGINE
Filed Feb. 2, 1961 5 Sheets-Sheet 3

FIG. 4

INVENTOR.
CARL STEFANCIN
BY Hudson, Boughton,
Williams, David & Hoffmann
ATTORNEYS May 15, 1962 C. STEFANCIN 3,034,484
ROTARY ENGINE
Filed Feb. 2, 1961 5 Sheets-Sheet 4

INVENTOR.
CARL STEFANCIN
BY Hudson, Boughton,
Williams, David & Hoffmann
ATTORNEYS United States Patent Office 3,034,484
Patented May 15, 1962

3,034,484
ROTARY ENGINE
Carl Stefancin, 13309 S. Woodland Road, Apt. 5,
Cleveland, Ohio
Filed Feb. 2, 1961, Ser. No. 86,667
20 Claims. (Cl. 121—53)

This invention relates to rotary engines of the expansible chamber type and, as one of its objects, aims to provide a novel form of engine of this type which will be capable and reliable for an efficient development of a large power output in relation to its size and weight when the engine is supplied with heated gaseous pressure medium as a motive fluid.

Another object is to provide a novel construction for such a rotary engine by which an effective sealing of the power chambers is achieved, and an effective cooling of various portions of the engine by liquid coolant supplied thereto.

A further object is to provide a novel rotary engine which employs antifriction bearings between the crankshaft and housing, and between the crankshaft and piston, and embodies means for directing liquid coolant through such antifriction bearings.

Still another object is to provide a novel rotary engine of the character above indicated and having a piston carrying lobe portions consisting of N lobe portions in an annular series and adapted for movement into and out of power chamber pockets disposed in an annular group extending around a cylinder chamber and consisting of $N+1$ pockets.

Additionally, this invention provides a novel rotary engine having the above-indicated characteristics and which is applicable to various uses, the range of usefulness of the engine being greatly extended by the provision therein of support means and power take-off means by which rotation of one or both of the housing and crankshaft components of the engine is permissible.

Other objects, novel characteristics and advantages of this invention will be apparent in the following detailed description and in the accompanying drawings forming a part of this specification and in which.

The expansible chamber rotary engine 10 is shown in the accompanying drawings as comprising in general, a housing 11 containing a cylinder chamber 12, a crankshaft 13 having a crank 14 located in the cylinder chamber, and a piston 15 mounted on the crank and operable in such cylinder chamber. The housing 11 and the crankshaft 13 are relatively rotatable by the provision of antifriction bearing means therebetween and here shown as comprising axially spaced bearing means 17 and 18, the latter of which consists of adjacently disposed bearings $18^a$ and $18^b$. The piston 15 is rotatably mounted on the crank 14 by antifriction bearing means here shown as comprising axially spaced bearings 19 and 20.

To extend the range of usefulness of the engine 10 the housing 11 is shown as being rotatable as well as the crankshaft 13 and, for this purpose, the engine includes support means 22 for the housing and which is here shown as comprising axially spaced stationary support members 23 and 24 located on axially opposite sides of the housing. The housing 11 is mounted in the support members 23 and 24 by having axially oppositely extending tubular projections 25 and 26 thereon which are received in antifriction bearings 27 and 28 of the support members. To provide for power delivery by the engine 10, power take-off devices 30 and 31 are provided which are connected respectively with the housing 11 and the crankshaft 13 so as to be rotated thereby.

The power take-off device 30 is here shown as being in the form of a pulley 32 fixed on a drive sleeve 33 as by means of a key 34, and the power take-off device 31 is likewise shown in the form of a pulley 35 secured on the crankshaft 13 as by means of a key 36. The drive sleeve 33 for the pulley 32 extends into the housing projection 26 and is suitably connected therewith as by means of a spline connection 37. The pulleys 32 and 35 are adapted to be connected with individual loads to be driven as by means of belts 38 and 39 extending around these pulleys.

The housing 11 and the crankshaft 13 are selectively rotatable, that is, the engine 10 can be operated with either or both of these components being rotatably driven. When delivery of power by the pulley 35 is desired the crankshaft 13 is rotatable while the housing 11 is held stationary, and vice versa, when delivery of power is desired only by the pulley 32 the housing is rotatable and the crankshaft is held stationary.

The housing 11 can be held stationary as by means of a selectively operable clutch device 41 of the contracting type disposed around and frictionally co-operable with the pulley 32. The crankshaft 13 can be held stationary by a similar clutch device 42 of the contracting type disposed around and frictionally co-operable with the pulley 35.

The clutch devices 41 and 42 are here shown as having their friction members 43 disposed in annular grooves $44^a$ and $44^b$ of the associated pulleys 32 and 35. The friction members of the clutch devices 41 and 42 are suitably mounted on an anchor pin 45 projecting from the support member 24. When delivery of power from the housing 11 and the crankshaft 13 simultaneously is desired, both of the clutch devices 41 and 42 are in a released condition so that both of the pulleys 32 and 35 will be rotatably driven at the same time.

The housing 11 is here shown as composed of connected housing members comprising an annular cylinder body 48 containing the cylinder chamber 12, a pair of end wall members 49 and 50 forming the end walls of the cylinder chamber, and a pair of cover members 51 and 52. The cylinder members just mentioned are maintained in an assembled relation by clamping rods 53 extending axially therethrough at circumferentially spaced points around the housing.

The housing 11 is here shown as provided with a second power take-off means comprising a gear 54 secured to the cover member 51, as by screws 55, and which can be used to drive an auxiliary device or other desired load through driven gear means 56 in mesh with the gear 54. The mounting projection 25 of the housing 11 is here shown as being a flanged sleeve member which is connected with the cover member 51 by a clamping action of the gear 54 against the flange thereof. The other mounting projection 26 of the housing 11 is here shown as being a central hollow stem projection of the cover member 52.

The cylinder chamber 12 of the cylinder body 48 is of a developed shape having an internal peripheral wall 58 extending around such chamber and containing an annular group of pockets 60 which, as explained hereinafter, form the power chambers of the engine. The engine 10 is shown in this case as having five such power chambers 60$^a$, 60$^b$, 60$^c$, 60$^d$ and 60$^e$. The pockets 60 are located at equally spaced points around the cylinder chamber 12 and comprise outward radial extensions of the latter.

The piston 15 is of a lobular form and comprises a hollow piston body 61 and an annular series of lobe projections 62 thereon and, in this case, comprising four such lobe projections 62$^a$, 62$^b$, 62$^c$ and 62$^d$. The lobe projections 62 are movable into and out of the pockets 60 during the relative rotation between the piston 15 and the housing 11 so that the power chambers 60$^a$, 60$^b$, 60$^c$, 60$^d$ and 60$^e$ formed by the pockets and referred to above are expansible and contractible. When a suitable motive fluid such as a heated gaseous fluid under pressure is supplied to the engine 10 in the manner to be explained hereinafter, the expansion of the fluid in the power chambers between the housing 11 and the piston 15 produces the relative rotation between these members.

Figures 1, 2, 13:
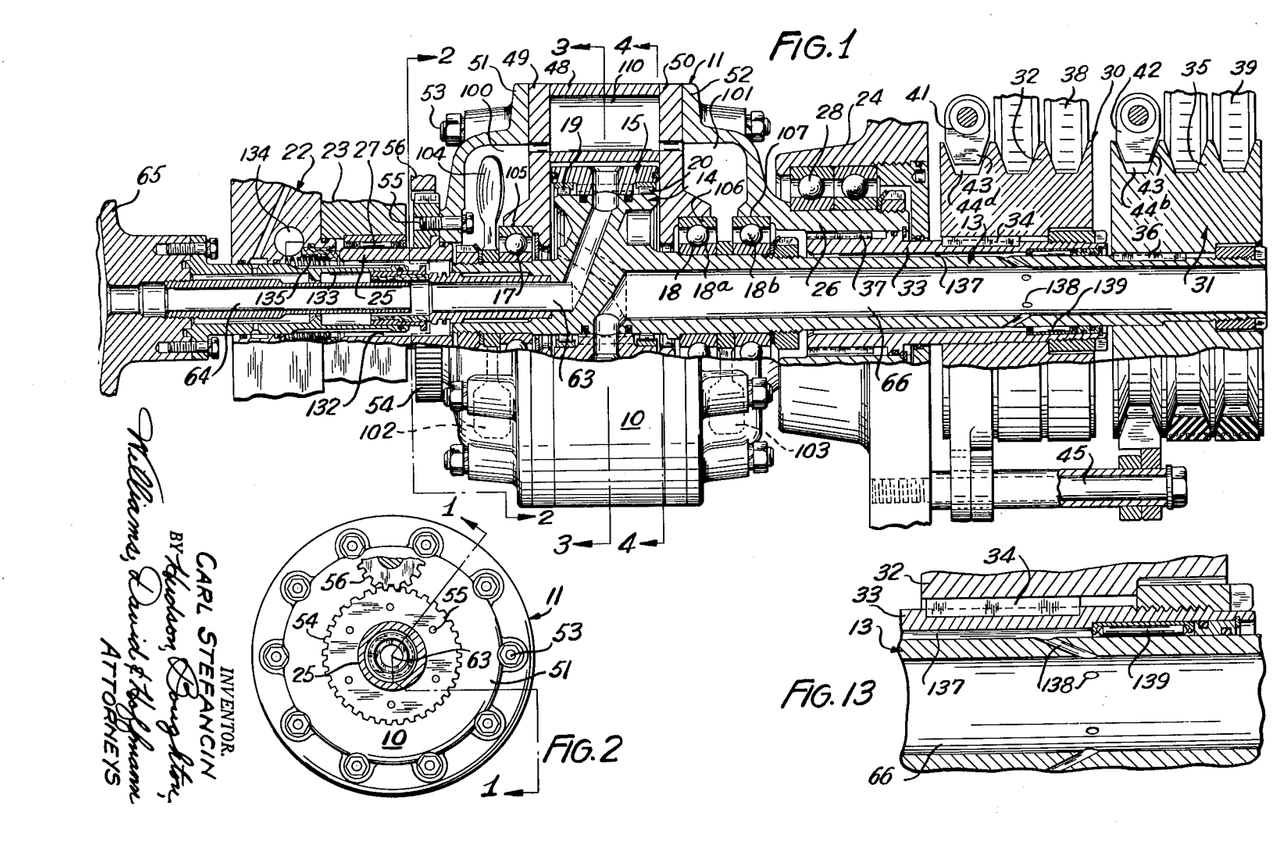
FIG. 1 is mainly an axial section taken through the novel rotary engine as indicated by section line 1—1 of FIGS. 2 and 3.
FIG. 2 is mainly an end elevation, with portions in section, the view being taken as indicated by the directional line 2—2 of FIG. 1.
FIG. 13 is a fragmentary axial section corresponding with a portion of FIG. 1 and showing coolant discharge means on a larger scale.

For supplying the motive fluid to the power chambers formed by the pockets 60, the engine 10 is shown in the drawings as having supply passage means which includes a supply passage 63 in the crankshaft 13 on one side of the crank 14, in this case, on the left side thereof as seen in FIG. 1. The supply passage means is here shown as also comprising a tubular member 64, which is connected with a hollow member 65 representing a source of motive fluid pressure, and has its delivery end in an axially disposed co-operating relation to the inlet end of the crankshaft passage 63. The engine 10 is also provided with exhaust passage means which includes an exhaust passage 66 in the crankshaft 13 on the opposite side of the crank 14, in this case, on the right side as shown in FIG. 1.

The supply and exhaust passages 63 and 66 of the crankshaft 13 are connected respectively with supply and exhaust ports 68 and 69 formed in the crank 14 and which extend for certain angular distances around the periphery of the latter. The piston 15 is provided with ports 70 in a radially disposed relation in the piston body 61 and located at points between the pairs of lobe projections 62. The ports 68 and 69 of the crank 14 and the ports 70 of the piston 15 co-operate as valve ports to constitute a valve means controlling the supply of pressure fluid to, and the exhausting of fluid from, the power chambers of the pockets 60. The piston ports 70 are four in number and are further identified by the reference numerals 70$^a$, 70$^b$, 70$^c$ and 70$^d$.

Figure 3:
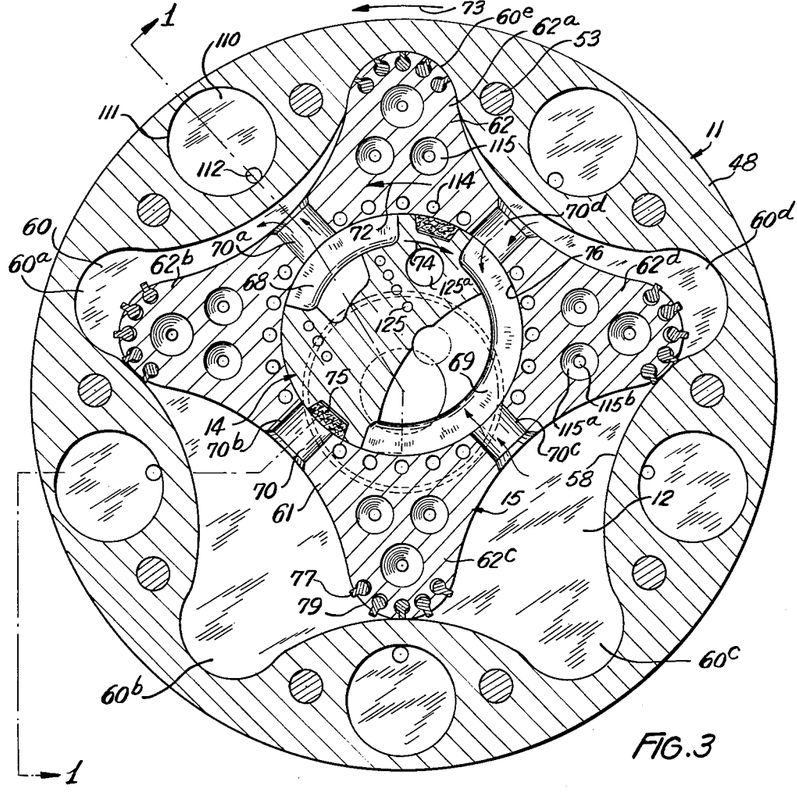
FIG. 3 is a transverse section of the engine on a larger scale and taken on section line 3—3 of FIG. 1.

When the housing 11 and the piston 15 are in the relative positions shown in FIG. 3, the supply passage 63 is connected with the power chamber 60$^a$ through the ports 68 and 70$^a$ to supply motive fluid to this chamber as long as these ports remain in communication with each other. The piston port 70$^b$ is shown in FIG. 3 as having been disconnected from the crankshaft port 68 so that the motive fluid in the power chamber 60$^b$ is undergoing expansion while temporarily trapped therein. The power chambers 60$^c$ and 60$^d$ are in communication with the exhaust port 69 of the crank 14 through the piston ports 70$^c$ and 70$^d$ for the escape of exhaust fluid from these power chambers during the contraction thereof.

During the operating cycle of the engine produced by the supply and exhaust of fluid to and from the power chambers as just explained above, the piston 15 will rotate in the cylinder chamber 12 in a counterclockwise direction as seen in FIG. 3 and as represented by the arrow 72. If the housing 11 is being held stationary, this counterclockwise rotation of the piston 15 will produce a clockwise rotation of the crank 14 and the pulley 35 connected with the crankshaft 13. Usually, however, the housing 11 will be free to rotate and, in that case, the housing will also rotate in a counterclockwise direction as seen in FIG. 3 and represented by the arrow 73.

Since the lobe projections 62 of the piston 15 consist of a given number of such projections such as N projections, and the power chamber pockets 60 of the housing 11 are greater in number such as $N+1$ pockets, it will be recognized that although the piston and housing rotate in the same counterclockwise direction, there will be a relative rotation between these members as the piston gyrates in the cylinder chamber 12. This relative rotation between the housing 11 and the piston 15 will be a clockwise rotation of the piston relative to the housing which will produce a resulting clockwise rotation of the crank 14, and consequently of the crankshaft 13, as indicated by the arrow 74 and the direction of which rotation is opposite to that of the housing.

Sealing means is provided for the piston 15 to prevent the loss of pressure fluid and this sealing means will be described next. One of the sealing means provided for this purpose comprises packing members 75 disposed in axial slots formed in the crank 14 at locations between the adjacent ends of the supply and exhaust ports 68 and 69. The packings 75 sealingly co-operate with an internal annular wall 76 of the piston body 61 for preventing pressure fluid of the supply port 68 from escaping to the exhaust port 69 along the periphery of the crank 14.

Another sealing means provided for the piston 15 comprises bar-type packing members 77, of suitable material, mounted on the piston by being located in axial slots 78 provided in a spaced-apart relation on the lobe projections 62. The packing members 77 are in sealing co-operation with the internal peripheral wall 58 of the cylinder body 48. On each of the lobe projections 62 a group of the slots 78 is provided in a substantially radially disposed relation and extending axially thereacross so as to be spaced around, and open through, the periphery of the convexly curved end portion 79. Each of the slots 78 is provided at the inner end thereof with an enlargement, preferably in the form of an axial bore in the lobe projection 62, forming a chamber 80.

Figure 7:
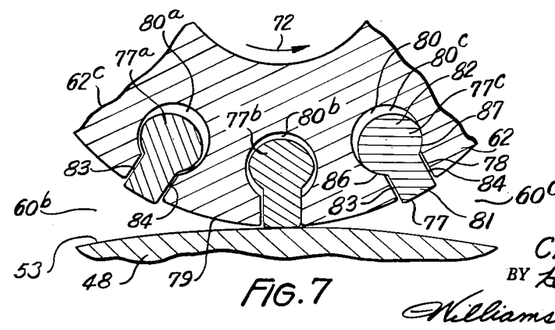
FIG. 7 is a fragmentary sectional view corresponding with a portion of FIG. 3 but on a still larger scale and further illustrating the packing means on one of the piston lobes.

Each of the packing members 77 has a blade portion 81 disposed in the slot 78 and projecting therefrom for contact with the peripheral wall 58 as shown in FIG. 7. The packing member 77 also comprises a head enlargement 82 of convex shape at the inner end of the blade portion 81 and which is of larger transverse dimension than the slot 78 so as to be confined in the chamber 80.

The blade portion 81 is thinner than the circumferential width of the slot 78 so that spaces will remain on opposite sides of the blade portion as fluid conducting passages 83 and 84 which, at certain times, will be in communication with the chamber 80. Valve seat elements 86 and 87 are provided on the lobe projection 62 on opposite sides of the slot 78 and in a position facing the chamber 80 so as to be in a location for seating engagement of the head 82 thereagainst for closing the passages 83 and 84, as shown in FIG. 7 for the packing member in the right hand portion of this view.

To explain the functioning of the packing members 77, further reference will be made to FIG. 7 wherein three of these packing members 77ª, 77ᵇ and 77ᶜ are shown in different operative positions and correspond with three of the packing members carried by the lobe projection 62ᶜ of FIG. 3. The packing member 77ª is accordingly adjacent the power chamber 60ᵇ in which an expansion of the pressure motive fluid is taking place, and the packing member 77ᶜ is adjacent the power chamber 60ᶜ from which motive fluid is being exhausted. The intermediate packing member 77ᵇ is in engagement with the peripheral wall 58 and can be referred to as being in a dead-center position.

With the packing members 77 of FIG. 7 in the relative positions just mentioned above, it will be seen that pressure fluid from the power chamber 60ᵇ will enter the associated packing chamber 80ª through the passages 83 and 84. Whenever one of the packing members is in the dead-center position of the packing member 77ᵇ, loss of pressure fluid from the power chamber 60ᵇ to the power chamber 60ᶜ by a flow through the packing chamber 80ᵇ will be prevented by a closed condition of the passage 84. The passage 84 is closed at this time by the action of the pressure fluid of the power chamber 60ᵇ against the blade portion 81 of the packing member by which the right or leading side of the blade portion is pressed against the adjacent side wall of the slot 78.

When one of the packing members 77 moves beyond the dead-center position and is in the location represented by the packing member 77ᶜ, pressure fluid will be trapped in the associated packing chamber 80ᶜ and this trapped pressure fluid will be effective against the head 82 for holding the stem 81 in a projecting relation ready for subsequent contact with the peripheral wall 58 when the lobe projection 62ᶜ moves into the next pocket 60 of the cylinder body 48. The expansive action of the pressure fluid in the packing chamber 80ᶜ also causes the head 82 to be pressed in a seating relation against the valve seat elements 86 and 87 for maintaining the trapped condition of the fluid.

From the construction described above for the packing members 77 and the location thereof on the lobe projections 62 of the piston 15, it will accordingly be seen that for each lobe projection there will be at least one of the packing members in sealing contact with the peripheral wall 58 regardless of the rotative position of the piston in the cylinder chamber 12, so that an efficient sealing of the piston will be achieved for preventing the escape of pressure fluid from one to another of the power chamber pockets 60.

The sealing means of the piston 15 also comprises segment-shaped packing members 90, of suitable material, on the ends of the piston body 61 (see FIGS. 4 and 6) for sealing cooperation with the end wall members 49 and 50 of the housing 11. To accommodate the packing members 90 the piston body 61 is provided on each end thereof with a packing groove 91 which follows the contour of the piston and lies inwardly of the outer peripheral surface thereof. The packing groove 91 extends onto the lobe projections 62 and follows around each projection adjacent the periphery of the convexly curved end 79 thereof.

The portions of the grooves 91 lying on the lobe projections 62 extend across the ends of the packing chambers 80, which accommodate the heads 82 of the bar-type packing members 77, so that the packing groove on each end of the piston 15 is an endless groove extending therearound. The packing 90 can be a continuous packing strip disposed in the endless groove 91, but preferably, comprises long and short packing strip segments 90ª and 90ᵇ. The long segments 90ª are concavely curved segments disposed on the piston portions lying between the lobe projections 62, and the short segments 90ᵇ are convexly curved segments located on the end portions 79 of the lobe projections.

Figure 6:
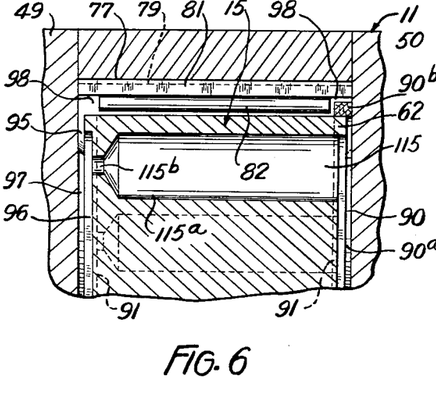
FIG. 6 is a fragmentary transverse section taken through adjacent co-operating portions of the housing and pistons as indicated by section line 6—6 of FIG. 4.

The axial width of the end portions 79 of the lobe projections 62 is only slightly smaller than the axial width of the cylinder chamber 12 so that curved lands 95 provided on these end portions will be in a sliding contact with the end walls of the cylinder chamber. The end wall portions of the piston lying radially inward of the lobe portions 79 are relieved portions 96 which are spaced from the end walls of the cylinder chamber by an intervening clearance space 97 as represented in FIG. 6 at the left side thereof where the packing strip segments 90ª and 90ᵇ have been omitted for clarity of illustration.

Figure 8:
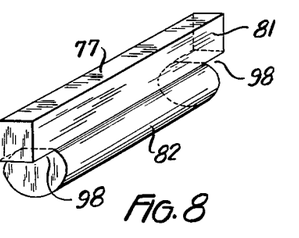
FIG. 8 is a perspective view showing one of the piston packing members in detached relation.

The packing strip segment 90ª are substantially circumferentially coextensive with the relieved piston portions 96, and the packing strip segments 90ᵇ are substantially circumferentially coextensive with the curved lands 95. The segments 90ª and 90ᵇ project axially from the packing groove 91 a sufficient distance so as to always be in sealing contact with the end walls of the cylinder chamber. As shown in FIGS. 6 and 8 the bar-type packing members 77 are undercut by the provision of notches 98 in the ends thereof so that the head 82 of each packing member is of a shorter axial length than the blade 81. The notches 98 provide clearance spaces which permit the packing strip segments 90ᵇ to extend across the ends of the packing members 77 without interference therebetween.

The cover members 51 and 52 of the housing 11 cooperate with the end wall members 49 and 50 to define annular auxiliary chambers 100 and 101 on axially opposite sides of the cylinder chamber 12. One purpose for the auxiliary chambers 100 and 101 is to accommodate rotatable counterweights 102 and 103 which are secured to the crankshaft 13 and located in these chambers. The counterweights 102 and 103 are located in a counterbalancing relation to the crank 14 and are of an appropriate mass to counterbalance the same. The counterweight 102 is preferably constructed so as to also constitute or include an impeller 104 for causing movement of liquid coolant in a manner to be explained hereinafter.

The end wall member 49 carries an annular bearing seat 105 on the side thereof facing the auxiliary chamber 100 and in which the outer race of the antifriction bearing 17 is received. Similarly, the end wall member 50 carries an annular bearing seat 106 facing the auxiliary chamber 101 and in which the outer race of the antifriction bearing 18ª is received. The cover member 52 is similarly provided with an annular bearing seat 107 in which is disposed the outer race of the antifriction bearing 18ᵇ.

The antifriction bearings 17, 18ª and 18ᵇ are all of the rollable type having an annular series of circumferentially spaced rollable elements. The spaces between the rollable elements of these bearings form passages for a flow of coolant liquid through the bearings as will be presently described. The antifriction bearings 19 and 20 are likewise of the rollable type comprising an annular series of circumferentially spaced rollable elements and the spaces between the rollable elements form passages for a flow of coolant liquid through these bearings, as will also be presently explained. The liquid coolant which flows through the antifriction bearings 17, 18ª, 18ᵇ, 19 and 20 serves also to lubricate these bearings.

Figure 4:
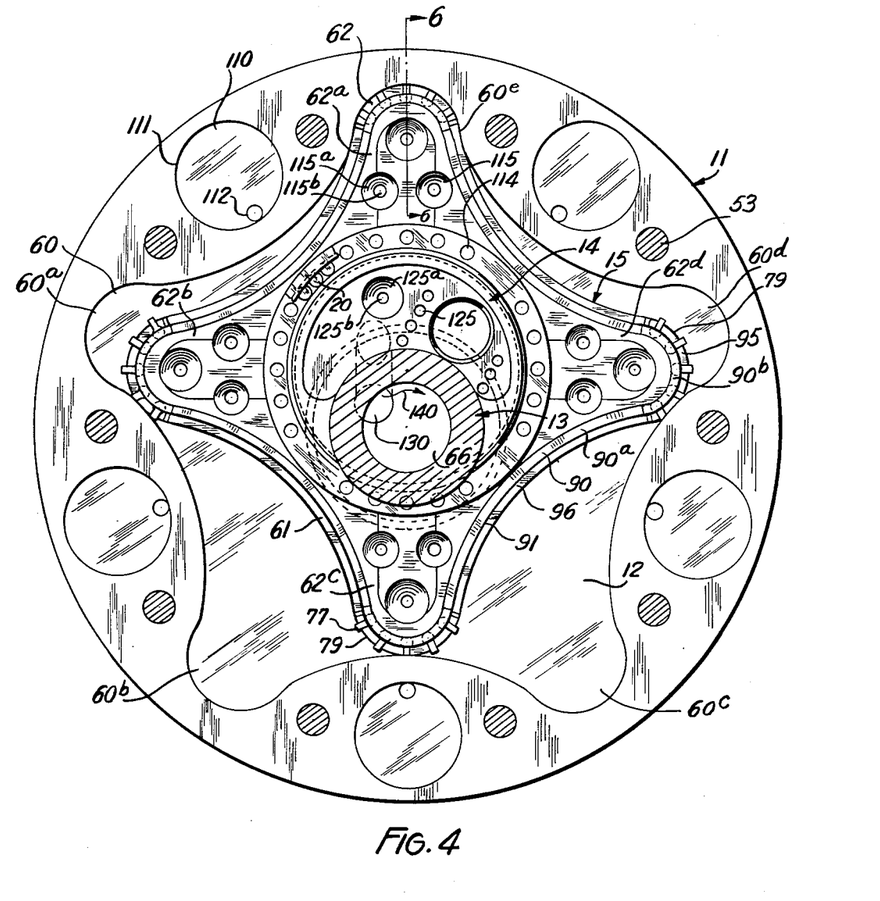
FIG. 4 is a similar transverse section taken on section line 4—4 of FIG. 1 and showing the piston and the cylinder section of the housing in end elevation.
Figure 5:
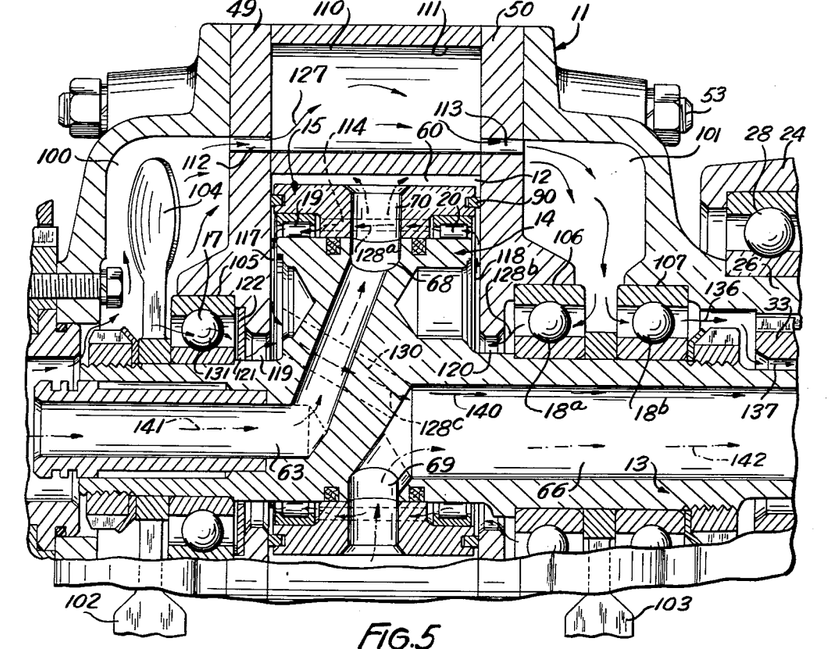
FIG. 5 is a partial axial section corresponding with a portion of FIG. 1 but with portions of the engine shown on a larger scale and with paths of fluid flow indicated by arrows.

For cooling of the engine 10 cooling passage means is provided therein for a flow of a suitable liquid cooling medium, such as water, and comprises various passages in the housing 11, the piston 15 and the crank 14, as will now be explained. The cooling passages 110 of the housing 11 are located at circumferentially spaced points around the cylinder chamber 12 and are formed in part by axial bores 111 in the cylinder body 48 at points between the pockets 60 of the latter. As shown in FIGS. 3, 4 and 5 the bores 111 are of a relatively large diameter and are located in the thicker portions of the cylinder housing 48 so as to reduce the amount of metal contained in this member.

The cooling passages 110 of the housing 11 are also formed in part by connecting passages 112 and 113 extending through the end wall members 49 and 50 and which connect the ends of the bores 111 with the auxiliary chambers 100 and 101. The connecting passages 112 and 113 serve as orifice openings for restricting and controlling the flow of the liquid coolant through the housing passages 110. The housing passages 110 thus extend axially of the engine in a generally parallel relation to the rotation axis of the crankshaft 13.

The cooling passages of the piston 15 comprise two groups of axially extending passages 114 and 115 formed in the piston and the above-mentioned flow passages in the antifriction bearings 19 and 20. The piston passages 114 extend through the piston body 61 adjacent the internal peripheral wall 76 thereof, and the piston passages 115 extend axially through the lobe projections 62 of the piston. The passages 115 are formed in part by relatively large-diameter counterbores 115$^a$ provided in the lobe projections 62 for reducing the amount of metal contained therein and in part by flow control orifice openings 115$^b$ at the bottom of the counterbores.

The piston passages 114 and 115 all lie radially inward of the segmental end packings 90$^a$ and 90$^b$ of the piston and are connected at opposite ends thereof with annular coolant conducting chambers 117 and 118 lying on axially opposite sides of the crank 14. The coolant conducting chambers 117 and 118 are formed by the intervening spaces lying between the end wall members 49 and 50 and the adjacent end portions of the crank 14 and piston 15. The end wall members 49 and 50 are provided with annular openings around the crankshaft 13 forming ring-shaped connecting passages 119 and 120 by which the coolant conducting chambers 117 and 118 are connected respectively with the auxiliary chambers 100 and 101 of the housing 11.

The connection of the auxiliary chamber 100 with the coolant conducting chamber 117 through the ring-shaped passage 119 also extends through the antifriction bearing 17 and is restricted by an annular orifice opening 121 of relatively narrow radial width. The orifice 121 is formed between the crankshaft 13 and an annular blocking member 122 mounted in the end wall member 49 adjacent the antifriction bearing 17. The annular orifice 121 thus restricts and controls the volume of coolant flow through the antifriction bearing 17 and the annular connecting passage 119. The connection of the auxiliary chamber 101 with the coolant chamber 118 through the annular connecting passage 120 also extends through the antifriction bearing 18$^a$.

The passage means for cooling of the crank 14 by the liquid coolant comprises passages, or groups of passages, 125 formed in the crank so as to extend axially therethrough with the ends thereof in communication with the coolant conducting chambers 117 and 118. One or more of the passages 125 can be formed in part by a counterbore 125$^a$ and a control orifice 125$^b$ at the bottom of the counterbore.

From the character and location of the cooling passages 110 of the housing, the passages 114 and 115 of the pistons 15 and 125 of the crank 14, it will be seen that all of these passages extend generally axially of the engine and provide substantially parallel coolant flow paths. The flow of coolant through the housing passages 110 will be in a forward axial direction toward the right, as seen in FIG. 5 and represented by the full-line arrows 127, and will be a flow from the auxiliary chamber 100 to the auxiliary chamber 101 and produced at least in part by the impeller 104. The flow of coolant from the auxiliary chamber 101 to the auxiliary chamber 100 through the piston passages 114 and 115, and through the crank passages 125, is a return axial flow in the opposite direction and toward the left as seen in FIG. 5 and represented by the broken-line arrows 128$^a$. The coolant for the piston 15 and crank 14 flows from the auxiliary chamber 101 into the coolant conducting chamber 118 through the bearing 18$^a$ and through the annular connecting passage 120, as represented by the full-line arrows 128$^b$.

Discharge of the coolant from the engine 10 takes place through the exhaust passage 66 of the crankshaft 13 and, for this purpose, a coolant discharge passage 130 is provided in the crank 14 and connects the coolant conducting chamber 117 with the inner end of the exhaust passage 66. The discharge of coolant into the exhaust passage through the coolant discharge passage 130 is represented by the broken-line arrows 128$^c$.

Since the coolant discharge passage 130 is connected with the coolant conducting chamber 117, it is in communication with the piston passages 114 and 115 and the crank passages 125 at a junction point located downstream from the antifriction bearing 19. The connection of the coolant discharge passage 130 with the auxiliary chamber 100 is likewise on the downstream side of the antifriction bearing 17 since coolant flow takes place through the annular passage 119 and the annular orifice 121 in the direction represented by the full-line arrows 131.

The liquid coolant supplied to the engine 10 enters the auxiliary chamber 100 through the tubular housing projection 25 by flowing through an annular passage 132 formed between this projection and a stationary sleeve projection 133 of the hollow member 65. The coolant is delivered to the annular passage 132 from a suitable source through a supply passage 134 (see FIG. 1) of the stationary housing support means 22. The annular coolant supply passage 132 is formed in part by a packing sleeve 135 which is suitably pressed into sealing engagement with the outer end of the tubular housing projection 25. The liquid coolant being supplied through the passage 134 is preferably under a suitable pressure.

A portion of the coolant which is supplied to the auxiliary chamber 101 is discharged therefrom through the antifriction bearing 18$^b$ for cooling the latter as represented by the full-line arrows 136 and flows away from this bearing in an axial direction through an annular discharge passage 137 formed by the space between the crankshaft 13 and the drive sleeve 33. The coolant in the annular passage 137 can be discharged therefrom into the exhaust passage 66 through inclined discharge ports 138 extending through the wall of the crankshaft 13. The coolant supplied to the annular passage 137 serves to cool the crankshaft 13 as well as an antifriction support bearing 139 which is interposed between the crankshaft and the drive sleeve 33. The coolant which is discharged into the exhaust passage 66 through the coolant discharge passage 130 and through the inclined ports 138 serves to cool the crankshaft 13 by flowing along the inside wall thereof, as indicated by the full-line arrows 140, as well as to quench and contract the exhaust gases in such exhaust passage.

Figures 9, 10, 11, 12:
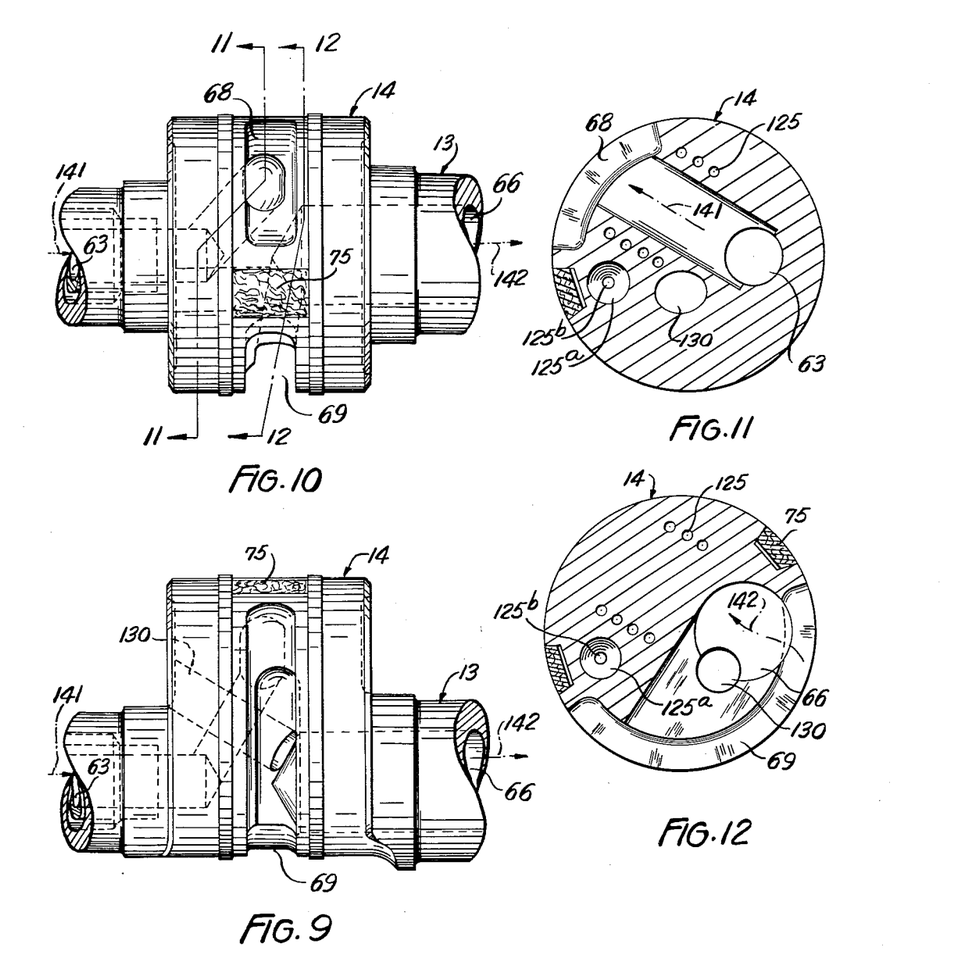
FIG. 9 is a partial side elevation showing the crank-carrying portion of the crankshaft in a detached relation.
FIG. 10 is a top plan view of such crank-carrying portion.
FIGS. 11 and 12 are transverse sections through the crank taken respectively on section lines 11—11 and 12—12 of FIG. 10.

In FIG. 5 of the drawings the coolant flow through various passages of the engine 10 is represented mainly by the full-line arrows 127, 128$^b$, 131 and 140 although the portions of the coolant flow taking place through the piston passages 114 and the coolant discharge passage 130 of the crank 14 are indicated by broken-line arrows 128$^a$ and 128$^c$ inasmuch as the latter passages appear only in broken lines in this FIG. 5 view. The flow of motive fluid to the power chambers 60 through the supply passage 63 is indicated in FIGS. 5 and 11 by construction-line arrows 141, and the flow of exhaust fluid in the exhaust passage 66 is indicated by construction-line arrows 142.

From the accompanying drawings and the foregoing detailed description it will now be readily understood that this invention provides a rotary engine of a novel construction which embodies the various features and achieves the various operating advantages hereinabove described. It will now also be understood that this novel rotary engine is applicable to various uses and has an operating flexibility which permits the engine to be operated with one or both of the housing and crankshaft components thereof in a rotating condition for the delivery of power thereby.

Although the rotary engine of this invention has been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. In a rotary engine; housing means containing a cylinder chamber and having walls, including an internal peripheral wall, defining an annular group of spaced pockets around said cylinder chamber; a crankshaft including a crank disposed in said cylinder chamber; first antifriction bearing means between said housing means and crankshaft and providing for relative rotation therebetween; piston means in said cylinder chamber and having an annular series of spaced lobe portions movable into and out of said pockets in succession in contact with said peripheral wall so that said pockets comprise expansible power chambers; second antifriction bearing means between said piston means and crank and providing an operative connection therebetween; said annular series being comprised of N lobe portions and said annular group being comprised of $N+1$ pockets; passage means in one of the two means comprising said housing means and said piston means and connectible with said chambers in succession to supply heated gaseous pressure fluid thereto for expansive action between said housing means and piston means to produce the relative rotation therebetween; and other passage means in said housing means and located to direct liquid coolant through said first antifriction bearing means.

2. In a rotary engine; housing means containing a cylinder chamber and having walls, including an internal peripheral wall, defining an annular group of spaced pockets around said cylinder chamber; a crankshaft including a crank disposed in said cylinder chamber; first antifriction bearing means between said housing means and crankshaft and providing for relative rotation therebetween; piston means in said cylinder chamber and having an annular series of spaced lobe portions movable into and out of said pockets in succession in contact with said peripheral wall so that said pockets comprise expansible power chambers; second antifriction bearing means between said piston means and crank and providing an operative connection therebetween; said annular series being comprised of N lobe portions and said annular group being comprised of $N+1$ pockets; passage means in one of the two means comprising said housing means and said piston means and connectible with said chambers in succession to supply heated gaseous pressure fluid thereto for expansive action between said housing means and piston means to produce the relative rotation therebetween; and other passage means in said housing means and piston means and located to direct liquid coolant through said second antifriction bearing means.

3. In a rotary engine; housing means containing a cylinder chamber and having walls including an internal peripheral wall extending around said cylinder chamber; a crankshaft including a crank disposed in said cylinder chamber; first antifriction bearing means between said housing means and crankshaft and providing for relative rotation therebetween; a piston on said crank in contact with said peripheral wall and dividing said cylinder chamber into a plurality of expansible power chambers; second antifriction bearing means between said piston and crank; first passage means connectible with said power chambers in succession to supply heated gaseous pressure fluid thereto for expansive action against said piston to produce the relative rotation between said housing means and crankshaft; said housing means having other passage means therein located to direct liquid coolant through said first and second bearing means in succession; and sealing means effective between said housing means and the axially opposite end portions of said piston and extending in surrounding relation to said second bearing means for isolating said other passage means from said power chambers.

4. A rotary engine as defined in claim 3 wherein said other passage means of said housing means includes auxiliary chamber means; and impeller means connected with said crankshaft and operable in said auxiliary chamber means for moving said coolant through said other passage means.

5. A rotary engine as defined in claim 3 wherein said other passage means includes other passages in said housing means and lying outward of said internal peripheral wall; said other passages providing for a flow of said coolant through said housing means at points around said cylinder chamber and substantially in a coaxial parallel relation to the flow of said coolant through said second bearing means.

6. A rotary engine as defined in claim 3 wherein said other passage means includes auxiliary chamber means comprising a pair of axially spaced annular auxiliary chambers in said housing means, and other passages connecting said auxiliary chambers and lying outward of said internal peripheral wall; and counterweight means comprising axially spaced counterweights connected with said crankshaft and rotatable in said auxiliary chambers; and impeller means, comprised at least in part by one of said counterweights, for moving said coolant through said other passage means including the flow of a portion of said coolant through said other passages.

7. A rotary engine as defined in claim 3 wherein said first and second antifriction bearing means each comprises a plurality of axially spaced bearings; said other passage means being so located that the flow of said coolant is through the axially spaced bearings of said first and second bearing means in succession in a series relation.

8. In a rotary engine; housing means containing a cylinder chamber and having walls including an internal peripheral wall extending around said cylinder chamber; a crankshaft including a crank disposed in said cylinder chamber; first anti-friction bearing means between said housing means and crankshaft and providing for relative rotation therebetween; a piston on said crank in contact with said peripheral wall and dividing said cylinder chamber into a plurality of expansible power chambers; second antifriction bearing means between said piston and crank; passage means in said crankshaft including supply and exhaust passages for conducting heated gaseous pressure fluid and exhaust fluid respectively; co-operable valve elements on said crank and piston for connecting said power chambers with said supply and exhaust passages in sequence; the pressure fluid supplied to said power chambers being effective therein for expansive action against said piston to produce the relative rotation between said housing means and crankshaft; said housing means having other passage means therein for conducting liquid coolant including passage portions for directing such coolant through said first and second bearing means; sealing means effective between said housing means and the axially opposite end portions of said piston and extending in surrounding relation to said second bearing means for isolating said passage portions from said power chambers; and discharge passage means connecting said other passage means with said exhaust passage for escape of said coolant into the latter.

9. A rotary engine as defined in claim 8 wherein the connection of said discharge passage means with said other passage means comprises junction means communicating therebetween and located downstream from said first bearing means.

10. A rotary engine as defined in claim 8 wherein the connection of said discharge passage means with said other passage means comprises junction means communicating therebetween and located in a downstream relation to said first and second bearing means.

11. In a rotary engine; housing means containing a cylinder chamber and having walls, including end walls and an internal peripheral wall, defining an annular group of spaced pockets around said cylinder chamber; a crankshaft including a crank disposed in said cylinder chamber; first antifriction bearing means between said housing means and crankshaft and providing for relative rotation therebetween; a piston on said crank and having an annular series of lobe portions movable into and out of said pockets in succession in contact with said peripheral wall so that said pockets comprise expansible power chambers; second antifriction bearing means between said piston and crank; passage means connectible with said chambers in succession to supply heated gaseous pressure fluid thereto for expansive action against said piston to produce the relative rotation between said housing means and crankshaft; other passage means for conducting liquid coolant including passage portions in said end walls and located to direct said liquid coolant through said first and second bearing means; and sealing means effective between said end walls and the end portions of said piston and extending in surrounding relation to said second bearing means for isolating said other passage means from said power chambers.

12. A rotary engine as defined in claim 11 wherein said sealing means comprises endless groove means in the end portions of said piston in surrounding relation to said second bearing means and including groove portions on said lobe portions; and packing means in said groove means and co-operable with the end walls of said housing means.

13. A rotary engine as defined in claim 11 wherein said other passage means also comprises axial passages extending through said piston and formed in part by said second bearing means.

14. In a rotary engine; housing means containing a cylinder chamber; said housing means comprising a cylinder section having an inner peripheral wall defining an annular group of spaced pockets around said cylinder chamber, and cover members connected with said cylinder section to form the end walls of said cylinder chamber and containing spaced annular auxiliary chambers located axially outward of said end walls; a first plurality of spaced antifriction bearings in said cover members; a crankshaft mounted in said first bearings and having a crank located in said cylinder chamber; a piston rotatable on said crank and having an annular series of lobe portions movable into and out of said pockets in succession in contact with said peripheral wall so that said pockets comprise expansible power chambers; a second plurality of spaced antifriction bearings between said piston and crank; co-operating valve ports in said piston and crank; supply passage means and exhaust passage means in said crankshaft on axially opposite sides of said crank and connectible with said power chambers in sequence by said valve ports during rotation of said piston; said supply passage means being adapted to supply heated gaseous pressure fluid to said power chambers for expansive action against said piston to rotate the same; and coolant passage means adapted to be supplied with liquid coolant and comprising substantially parallel-flow first and second axial coolant passages, and discharge passage means connecting said coolant passage means with said exhaust passage for discharge of the coolant into the latter; said first coolant passage being connected between said auxiliary chambers and located in said housing means outwardly of said peripheral wall, and said second coolant passage extending in a series relation through at least one bearing of said first plurality and all the bearings of said second plurality.

15. A rotary engine as defined in claim 14 wherein said first coolant passage comprises a bore in said cylinder section, and orifice means of predetermined size in at least one of said cover members and communicating with said bore for controlling coolant flow through said first coolant passage.

16. A rotary engine as defined in claim 14 wherein said second coolant passage comprises openings in said end walls and connected with said auxiliary chambers through bearings of said first plurality, and axial passages extending through said piston and formed in part by the bearings of said second plurality.

17. In a rotary engine; housing means containing a cylinder chamber and having internal wall means extending around the periphery of said cylinder chamber; a piston rotatable in said cylinder chamber and having a sealing portion in movable contact with said wall means for dividing said cylinder chamber into a plurality of power chambers; shaft means operably connected with said piston; motive fluid passage means connectible with said power chambers comprising supply passage means for supplying pressure fluid to said power chambers and exhaust passage means for conducting exhaust fluid from said power chambers; said sealing portion having slot means extending thereinto from the periphery thereof, and recess means of greater width than said slot means and connected with the inner end of the slot means; valve seat elements on said sealing portion on opposite sides of said slot means and facing said recess means; and packing means on said sealing portion and sealingly co-operable with said wall means; said packing means comprising blade means disposed in and projecting from said slot means, and head means connected with the blade means and confined in said recess means; said recess means being connected to receive pressure fluid from an adjacent power chamber through portions of said slot means during a portion of the operating cycle of the engine, and said head means being engageable with said valve seat elements for trapping the pressure fluid in said recess means during another portion of said operating cycle.

18. A rotary engine as defined in claim 17 wherein said sealing portion comprises a convexly curved projection on said piston, and said slot means with their associated recess means comprise a plurality of slots and associated recesses in a spaced-apart relation on said curved projection; said packing means comprising a packing member for each slot and having connected blade and head portions.

19. A rotary engine as defined in claim 17 wherein said recess means comprises an axial bore in said sealing portion of the piston, and said valve seat elements comprise portions of the curved wall of said bore; the head means of said packing means being of convex shape for seating co-operation with the curvature of said valve seat elements.

20. A rotary engine as defined in claim 17 wherein said slot means includes a wall portion engageable by one side of said blade means for closing the passage of the slot means against flow of said pressure fluid therethrough on said one side of the blade means when said head means is disengaged from said valve seat elements.

References Cited in the file of this patent

UNITED STATES PATENTS

| | | |
|---|---|---|
| 880,009 | Burton | Feb. 25, 1908 |
| 1,168,099 | Motsinger | Jan. 11, 1916 |
| 1,276,056 | Gumprecht | Aug. 20, 1918 |
| 1,378,855 | Gallings | May 24, 1921 |
| 1,434,446 | McQueen | Nov. 7, 1922 |
| 2,162,771 | Winans | June 20, 1939 |

FOREIGN PATENTS

| | | |
|---|---|---|
| 9,359 | Great Britain | 1915 |
| 583,035 | Great Britain | Dec. 5, 1946 |
| 1,059,495 | France | Nov. 10, 1953 |
| 1,188,135 | France | Mar. 9, 1959 |